United States Patent
Ikezawa

(10) Patent No.: US 12,051,086 B2
(45) Date of Patent: Jul. 30, 2024

(54) SALES PRICE MANAGEMENT DEVICE, SALES PRICE MANAGEMENT SYSTEM, CONTROL METHOD AND STORAGE MEDIUM

(71) Applicant: NEC Corporation, Tokyo (JP)

(72) Inventor: Rumi Ikezawa, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 17/431,534

(22) PCT Filed: Jan. 8, 2020

(86) PCT No.: PCT/JP2020/000331
§ 371 (c)(1),
(2) Date: Aug. 17, 2021

(87) PCT Pub. No.: WO2020/174881
PCT Pub. Date: Sep. 3, 2020

(65) Prior Publication Data
US 2022/0122116 A1    Apr. 21, 2022

(30) Foreign Application Priority Data

Feb. 28, 2019    (JP) ................. 2019-036248

(51) Int. Cl.
G06Q 30/02        (2023.01)
G06Q 30/0201     (2023.01)
G06Q 30/0238     (2023.01)

(52) U.S. Cl.
CPC ..... *G06Q 30/0238* (2013.01); *G06Q 30/0206* (2013.01)

(58) Field of Classification Search
CPC .............. G06Q 30/0238; G06Q 30/0206
See application file for complete search history.

(56) References Cited

U.S. PATENT DOCUMENTS 5,557,088 A      9/1996   Shimizu et al.
2008/0153513 A1* 6/2008   Flake ............... G06Q 30/02
                                          455/456.3

(Continued)

FOREIGN PATENT DOCUMENTS

CN    104574136 A1    4/2015
JP    H07254021 A    10/1995
(Continued)

OTHER PUBLICATIONS

Wiley Encyclopedia of Computer Science and Engineering (Year: 2009).*

(Continued)

*Primary Examiner* — Breffni Baggot

(57) ABSTRACT

A sales price management device includes an acquisition unit, a receiving unit, an update unit, a determination unit and a display changing unit. The acquisition unit receives sales price change information relating to a sales price change from a POS server which manages information on sales of commodities. The receiving unit receives, from a mobile terminal used by a customer, commodity identification information indicative of a commodity the customer intends to purchase at a store where the customer enters. The determination unit determine, on a basis of the sales price change information and a purchasing commodity list, whether or not a change of the sales price for the commodity in the purchasing commodity list is required. The display changing unit changes, on the basis of whether or not the change of the sales price is required, a display of the sales price for the commodity in the purchasing commodity list that the mobile terminal displays.

10 Claims, 12 Drawing Sheets

(56) References Cited

U.S. PATENT DOCUMENTS

| | | | |
|---|---|---|---|
| 2009/0030787 A1* | 1/2009 | Pon | G06Q 30/0239 705/14.27 |
| 2011/0010256 A1 | 1/2011 | Yoshimoto | |
| 2012/0095853 A1 | 4/2012 | Von Bose et al. | |
| 2014/0358664 A1* | 12/2014 | Wheeler | G06Q 30/0233 705/14.33 |
| 2015/0025990 A1 | 1/2015 | Suzuki | |
| 2015/0112804 A1 | 4/2015 | Fujiwara | |
| 2018/0293562 A1* | 10/2018 | Squire | G06Q 30/0238 |

FOREIGN PATENT DOCUMENTS

| | | |
|---|---|---|
| JP | 2005-010960 A | 1/2005 |
| JP | 2005-084970 A | 3/2005 |
| JP | 2007213276 A | 8/2007 |
| JP | 2009-288965 A | 12/2009 |
| JP | 2011018225 | 1/2011 |
| JP | 2013041354 A | 2/2013 |
| JP | 2013541107 A | 11/2013 |
| JP | 2014-092977 A | 5/2014 |
| JP | 2015022358 A | 2/2015 |
| JP | 2016-062273 A | 4/2016 |
| JP | 2016-173700 A | 9/2016 |

OTHER PUBLICATIONS

International Search Report for PCT Application No. PCT/JP2020/000331, mailed on Mar. 17, 2020.
Japanese Office Action for JP Application No. 2021-501667 mailed on Dec. 20, 2022 with English Translation.
CN Office Action for Chinese Patent Application No. 202080013992.5, mailed on Oct. 27, 2023 with English Translation.
JP Office Communication for JP Application No. 2023-077762, mailed on Apr. 2, 2024 with English Translation.

* cited by examiner

100: SALES PRICE MANAGEMENT SYSTEM

SALES PRICE MANAGEMENT DEVICE, SALES PRICE MANAGEMENT SYSTEM, CONTROL METHOD AND STORAGE MEDIUM

TECHNICAL FIELD

This application is a National Stage Entry of PCT/JP2020/000331 filed on Jan. 8, 2020, which claims priority from Japanese Patent Application 2019-036248 filed on Feb. 28, 2019, the contents of all of which are incorporated herein by reference, in their entirety.

BACKGROUND ART

As a commodity sales system for customers who come to a store to purchase commodities, a system is known in which a customer reads a bar code of a commodity and registers the commodity by using a mobile terminal such as a smartphone owned by the customer to perform the payment. For example, Patent Literature 1 discloses a self-shopping system including a mobile terminal and a management server. The above mobile terminal acquires commodity information on a commodity to be purchased and transmits adjustment information including all the commodity information obtained to the management server. The above management server generates and outputs sort breakdown information in which each commodity name is listed in order of price based on the commodity information included in the adjustment information.

PRIOR ART DOCUMENTS

Patent Literature

Patent Literature 1: JP 2013-41354A

SUMMARY OF THE INVENTION

Problem to be Solved by the Invention

The sales price of the commodity may be changed according to prescribed conditions such as a package sale. When such a change of the sales price of commodity occurs in the self-shopping system according to Patent Literature 1, unfortunately, the customer cannot know the correct sales price until the time of the adjustment.

In view of the issues described above, it is therefore an example object of the present disclosure to provide a sales price management device, a sales price management system, a control method and a storage medium capable of displaying the accurate sales price on the mobile terminal of the customer.

Means for Solving the Problem

In one mode of the sales price management device, there is provided a sales price management server including: an acquisition unit configured to acquire sales price change information relating to a sales price change; a receiving unit configured to receive, from a mobile terminal used by a customer, commodity identification information indicative of a commodity the customer intends to purchase at a store where the customer enters; a determination unit configured to determine, on a basis of the sales price change information and a purchasing commodity list that is a list of the commodity, whether or not a change of the sales price for the commodity in the purchasing commodity list is required; and a display changing unit configured, in a case where the change of the sales price is required, to change a display of the sales price for the commodity in the purchasing commodity list that the mobile terminal displays.

In one mode of the sales price management system, there is provided a sales price management system including: a mobile terminal used by a customer; and a sales price management server which manages a sales price for a purchasing commodity list that is a list of a commodity the customer intends to purchase at a store where the customer enters, the mobile terminal including: a commodity identification acquisition unit configured to acquire commodity identification information indicative of a commodity the customer intends to purchase at the store; a commodity identification transmission unit configured to transmit the commodity identification information to the sales price management server; and a display controller configured to update a display on a display unit based on display information received from the sales price management server, the sales price management server including: an acquisition unit configured to acquire sales price change information relating to a sales price change; a receiving unit configured to receive, from the mobile terminal, the commodity identification information; a determination unit configured to determine, on a basis of the sales price change information and the purchasing commodity list, whether or not a change of the sales price for the commodity in the purchasing commodity list is required; and a display changing unit configured, in a case where the change of the sales price is required, to transmit, to the mobile terminal, the display information to change the display of the sales price for the commodity in the purchasing commodity list that the mobile terminal displays.

In one mode of the control method, there is provided a control method which a sales price management server executes, the control method including: acquiring sales price change information relating to a sales price change; receiving, from a mobile terminal used by a customer, commodity identification information indicative of a commodity the customer intends to purchase at a store where the customer enters; determining, on a basis of the sales price change information and a purchasing commodity list that is a list of the commodity, whether or not a change of the sales price for the commodity in the purchasing commodity list is required; and changing, in a case where the change of the sales price is required, a display of the sales price for the commodity in the purchasing commodity list that the mobile terminal displays.

In one mode of the storage medium, there is provided a non-transitory computer-readable storage medium storing a program executed by a computer, the program causing the computer to function as: an acquisition unit configured to acquire sales price change information relating to a sales price change; a receiving unit configured to receive, from a mobile terminal used by a customer, commodity identification information indicative of a commodity the customer intends to purchase at a store where the customer enters; a determination unit configured to determine, on a basis of the sales price change information and a purchasing commodity list that is a list of the commodity, whether or not a change of the sales price for the commodity in the purchasing commodity list is required; and a display changing unit configured, in a case where the change of the sales price is required, to change a display of the sales price for the commodity in the purchasing commodity list that the mobile terminal displays.

Effect of the Invention

An example advantage according to the present disclosure is to display the accurate sale price of the commodity included in a purchasing commodity list on the mobile terminal used by the customer.

DESCRIPTION OF EXAMPLE EMBODIMENTS

Hereinafter, with reference to the drawings, an example embodiment of a sales price management device, a sales price management system, a control method and a program will be described.

[Configuration of Price Control System]

Figure 1:
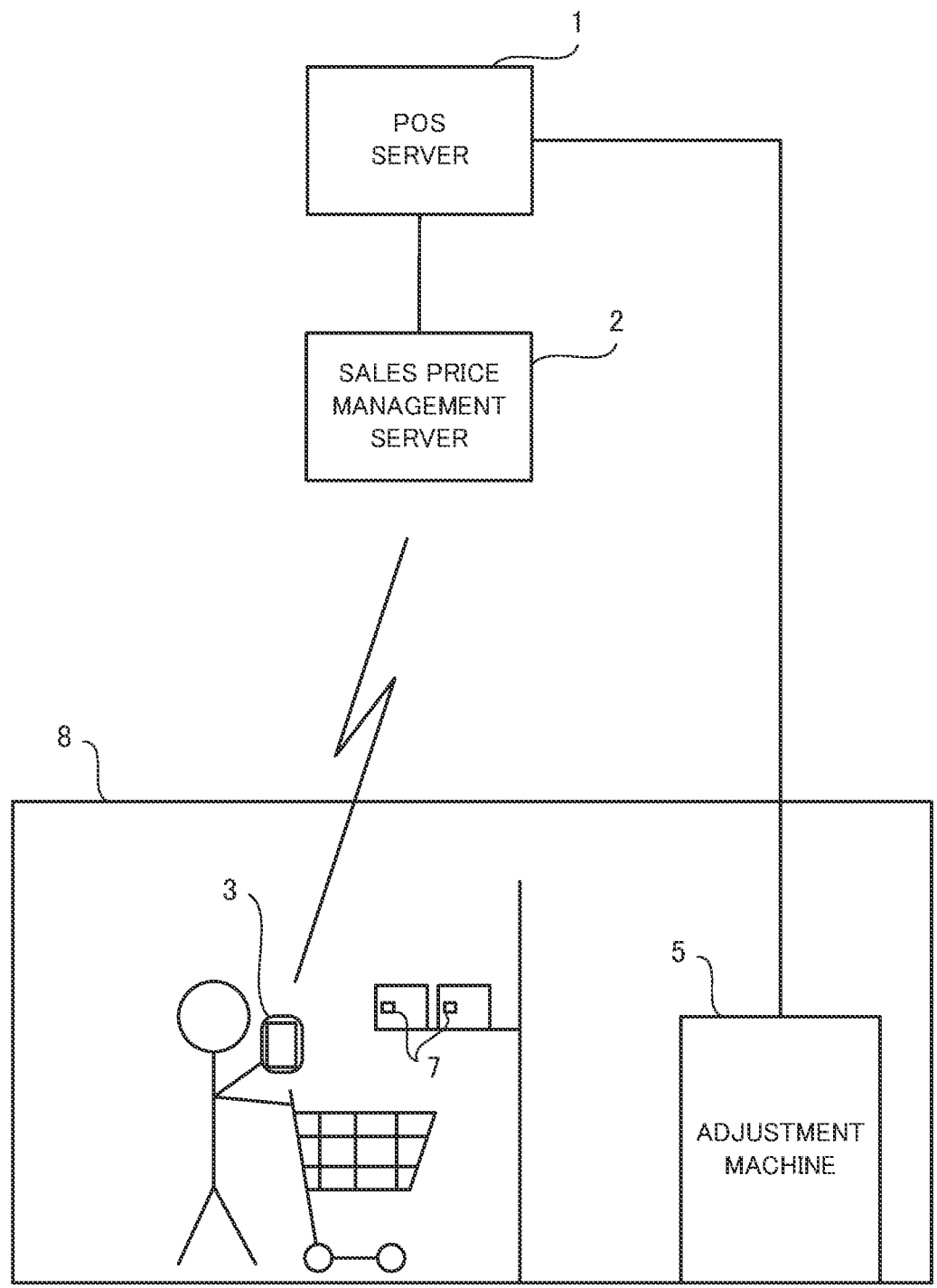
FIG. 1 illustrates the structure of a price control system according to an example embodiment.

FIG. 1 illustrates the configuration of the sales price management system 100 according to the present example embodiment. The sales price management system 100 mainly includes a POS server 1, a sales price management server 2, a mobile terminal 3, and an adjustment (accounting) machine 5. In the sales price management system 100, by reading a bar code 7 on a commodity (article or product) in the store 8 which sells commodities, the customer which uses the mobile terminal 3 performs registration of the commodity (also referred to as "purchasing commodity") which the customer intends to purchase. Thereafter, the customer adjusts an account by using the adjustment machine 5 in the store 8, or through electronic payment.

The POS server 1 is a server for managing various sales information such as commodity information and information on the amount of sales in the store 8, wherein the commodity information includes the price of commodities sold in the store 8 and inventory status. The POS server 1 can communicate with the sales price management server 2 and the adjustment machine 5 through a network or the like. The POS server 1 may be one that collectively manages the sales information relating to the series stores including the store 8. The POS server 1 may also be provided for each store and manages only the sales information relating to the store 8.

The sales price management server 2 is a server device for controlling the display of the mobile terminal 3, and can communicate with the mobile terminal 3 and the POS server 1 via a network or the like. The sales price management server 2 acquires and stores information necessary for display control of the mobile terminal 3 from the POS server 1. The sales price management server 2 transmits display information for the mobile terminal 3 to display various views to the mobile terminal 3. The above-described various views include a view (also referred to as a "purchasing commodity list view") for displaying a list (also referred to as a "purchasing commodity list") of purchasing commodities together with their sales prices, wherein the purchasing commodities are registered through reading process on the bar code 7 by the mobile terminal 3.

The sales price management server 2 may be configured by a plurality of server devices. For example, the sales price management server 2 may include a server device that mainly performs an interface operation with the mobile terminal 3 such as data exchange with the mobile terminal 3, and a server device that stores and manages information acquired from the POS server 1 and various information such as a purchasing commodity list. In this case, the former server device functions as a so-called application server, and the latter server device functions as a so-called database server. In this case, these server devices exchange information necessary for each server to execute the allocated process with each other through a network or the like.

The mobile terminal 3 is a mobile terminal used by a customer shopping at the shop 8, and has a function of reading a bar code 7 attached on a commodity, a function of displaying various views such as a purchasing commodity list view by communicating with the sales price management server 2, and the like. In FIG. 1, for convenience of explanation, though the mobile terminal 3 is displayed only one, the same number of the mobile terminal 3 are actually present as the number of customers entering the store 8.

The adjustment machine 5 is an accounting machine (so-called self-checkout machine) for the customer to perform the adjustment using the mobile terminal 3. The adjustment machine 5 is capable of communicating with the POS server 1, and transmits and receives various information necessary for the adjustment with the POS server 1.

[Device Configurations]

Next, the configurations of the POS server 1, the sales price management server 2, and the mobile terminal 3 will be described with reference to FIGS. 2 to 4.

Figure 2:
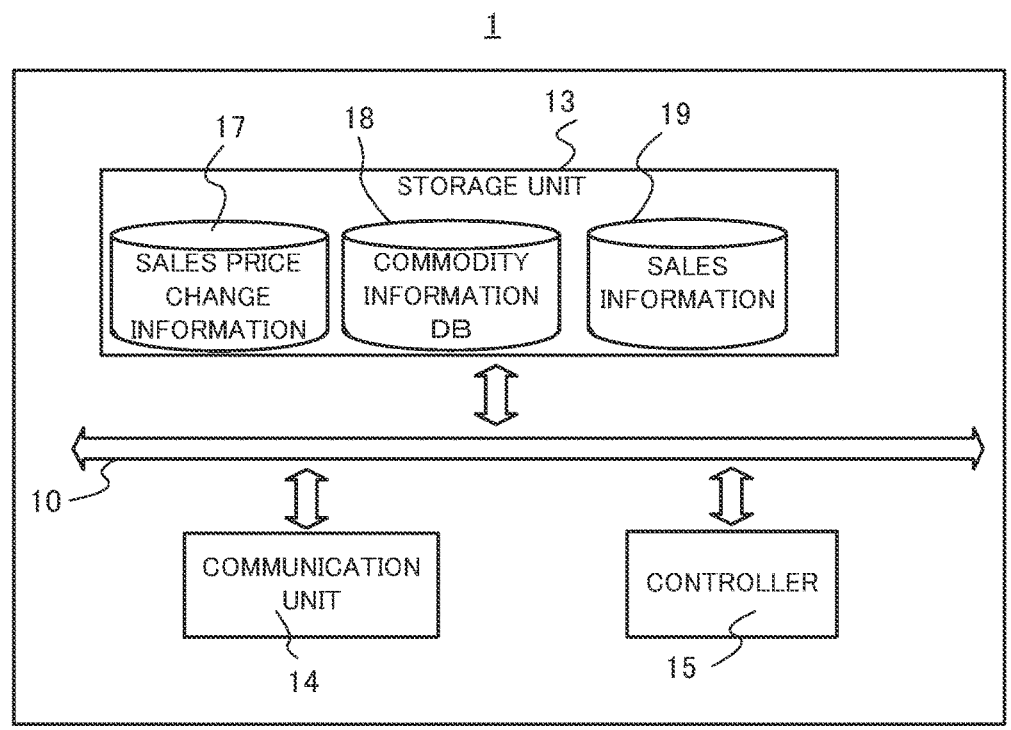
FIG. 2 illustrates a schematic configuration of a POS server.

FIG. 2 illustrates a schematic configuration of the POS server 1. The POS server 1 mainly includes a storage unit 13, a communication unit 14 for performing data communication, and a controller 15.

The storage unit 13 is configured by a memory such as a hard disk or a flash memory. The storage unit 13 stores a program to be executed by the controller 15, and the information necessary for the controller 15 to execute a predetermined process by executing a program. In the present example embodiment, the storage unit 13 includes sales price change information 17, commodity information DB (Database) 18, and sales information 19 which is information relating to the sales of the commodities. The storage unit 13 may store information relating to various sales other than the sales price change information 17, the commodity information DB 18 and the sales information 19.

The commodity information DB 18 is a database of information on the commodity dealt by stores including the store 8 and its affiliated stores. For example, the commodity information DB 18 includes the sales price of the commodity, information (also referred to as "commodity identification information") for identifying the commodity such as JAN (Japanese Article Number) codes, classification information relating to the commodity, and various information such as inventory status of the commodity.

Figure 5:
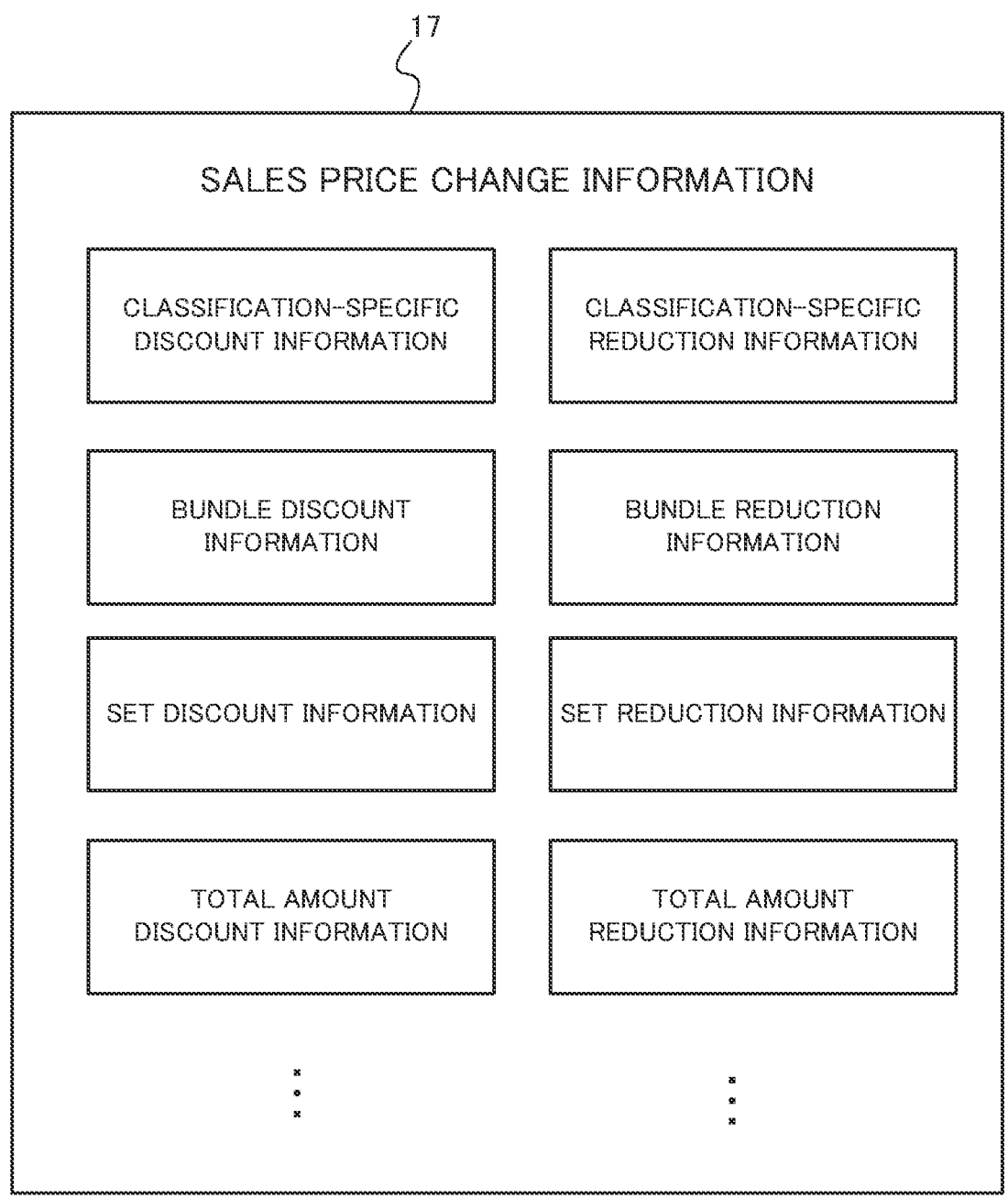
FIG. 5 is an example of the data structure of sales price change information.

The sales price change information 17 is information relating to the changes of the sales price. FIG. 5 illustrates an example of a data structure of the sales price change information 17. The sales price change information 17 includes at least one of any price discount information or reduction information, such as classification-specific discount information, bundle discount information, set (package) discount information, total amount (volume) discount information, classification-specific reduction information, bundle reduction information, set reduction information, and total amount reduction information.

The classification-specific discount information is information on the discount for the commodity belonging to specific classifications (e.g., frozen food, etc.). For example, in the classification-specific discount information, classification information indicating the classification to be discounted is associated with the discount rate. The bundle discount information is the information on the discount that is granted when a plurality of a specific kind of the commodity are purchased. For example, in the bundle discount information, the commodity (more specifically, the identification information thereof) to be discounted are associated with the quantity to be purchased and the discount rate thereof. The set discount information is information on the discount for a particular combination of the commodity. For example, in the set discount information, the combination of the commodity eligible for discount is associated with the discount rate thereof. The total amount discount information is information on the discount that occurs when the total amount of the purchasing commodity is equal to or greater than a predetermined amount. For example, in the total amount discount information, the total amount and the discount rate to be discounted are associated with each other. The classification-specific reduction information, bundle reduction information, set reduction information, and total amount reduction information are reduction information corresponding to the classification-specific discount information, bundle discount information, set discount information, total amount discount information, respectively.

As described above, the sales price change information 17 is information indicating the condition (also referred to as "sales price change condition") for the sales price change by discount or reduction and the degree (amount) of the sales price change. Hereafter, the terms "discount" and "reduction" include "rebate".

Referring again to FIG. 2, the configuration of the POS server 1 will be described. The controller 15 includes a CPU (Central Processing Unit) (not shown), a ROM (Read Only Memory) and a RAM (Random Access Memory), and performs various controls for the components in the POS server 1. For example, the controller 15, by communicating with the adjustment machine 5 via the communication unit 14, performs processing related to the adjustment, and then performs update or the like of the sales information 19. Further, the controller 15, by communicating with the sales price management server 2 via the communication unit 14, transmits information relating to the sales price change information 17 and the commodity information DB 18 to the sales price management server 2.

Figure 3:
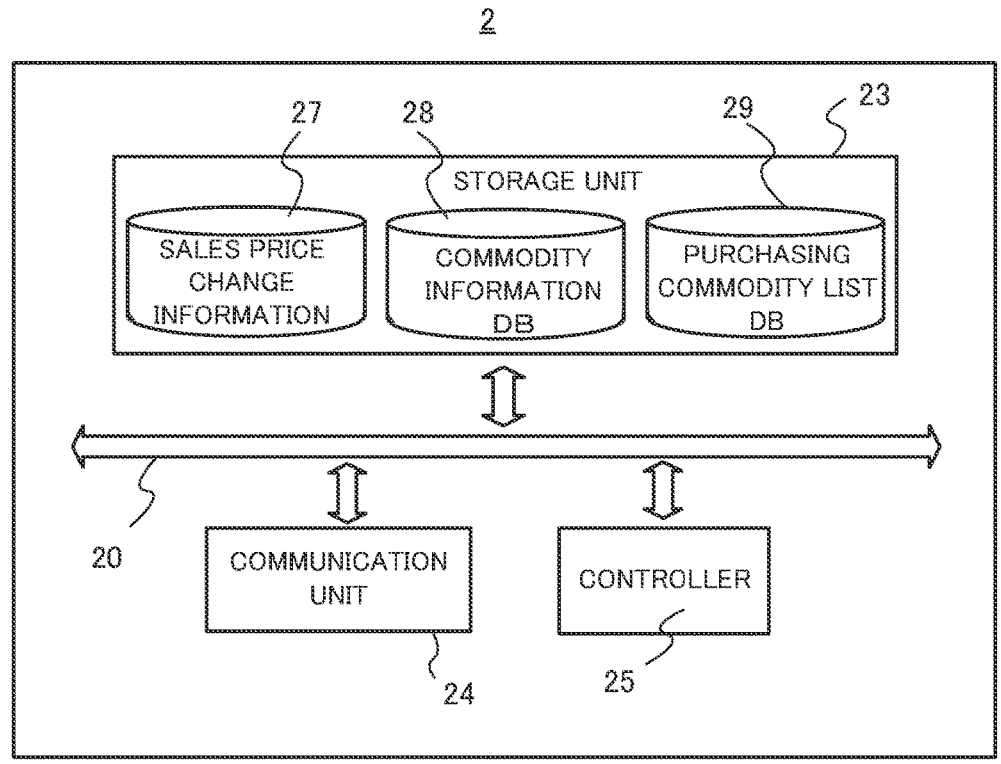
FIG. 3 illustrates a schematic configuration of a price control server.

FIG. 3 illustrates a schematic configuration of the sales price management server 2. the sales price management server 2 mainly includes a storage unit 23, a communication unit 24, and a controller 25. Each of these elements is connected to each other via a bus line 20.

The storage unit 23 is configured by a memory such as a hard disk or a flash memory. The storage unit 23 stores a program to be executed by the controller 25, and the information necessary for the controller 25 to execute a predetermined process by executing the program. In the present example embodiment, the storage unit 23 stores sales price change information 27, commodity information DB 28, and purchasing commodity list DB 29.

The sales price change information 27, that is substantially the same as the sales price change information 17, is information relating to changes of the price due to a discount or a reduction. Under the control of the controller 25, the sales price change information 27 is periodically or irregularly updated so as to synchronize with the sales price change information 17 stored on the POS server 1. The commodity information DB 28, that is substantially the same as commodity information DB 18, is a database of information on commodities. The commodity information DB 28 is periodically or irregularly updated to synchronize with the commodity information DB 18 stored in the POS server 1 under the control of the controller 25.

The purchasing commodity list DB 29 is a database of purchasing commodity lists for every mobile terminal 3 of customers who are shopping in the store 8. The purchasing commodity list is, for example, a list of combinations including at least the commodity identification information indicating the commodity and the quantity of the commodity that the customer intends to purchase. The purchasing commodity list is associated with information (also referred to as "customer identification information") for identifying either the customer using the mobile terminal 3 or the mobile terminal 3. Then, the purchasing commodity list is updated every time there occurs the addition, the deletion or the quantity changes of purchasing commodities, which are performed based on the operation on the mobile terminal 3.

The controller 25 includes a CPU (not shown), ROM and RAM, and performs various controls for each component in the sales price management server 2. The detailed description of the control which the controller 25 executes will be given with reference to FIG. 6.

Figure 4:
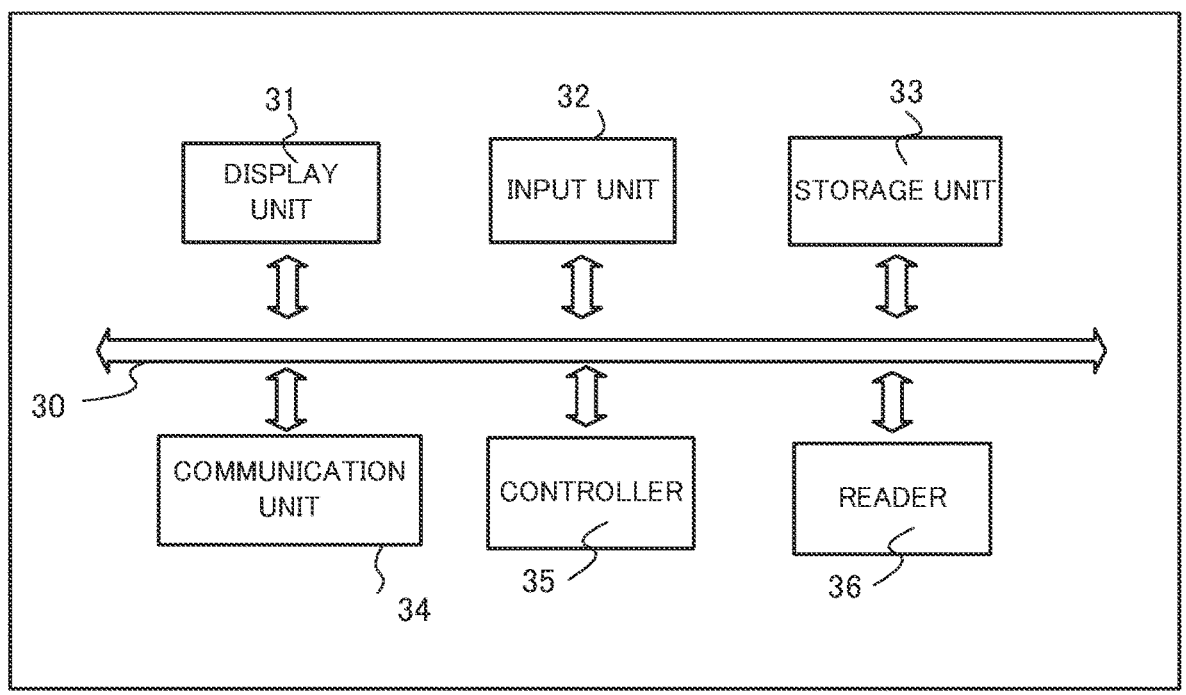
FIG. 4 illustrates a schematic configuration of a mobile terminal.

FIG. 4 illustrates a schematic configuration of a mobile terminal 3. The mobile terminal 3 mainly includes a display unit 31, an input unit 32, a storage unit 33, a communication unit 34, a controller 35, and a reader 36. Each of these elements is connected to each other via a bus line 30.

Under the control by the controller 35, the display unit 31 performs display of various information such as a purchasing commodity list view. The input unit 32 is an interface that accepts an input by a user. Examples of the input unit 32 include a touch panel, a button, and a voice input device.

The storage unit 33 is configured by a memory such as a hard disk or a flash memory. The storage unit 33 stores a program to be executed by the controller 35, and information necessary for the controller 35 to execute a predetermined process by executing the program. For example, the storage unit 33 stores a dedicated application program that is activated at the start of shopping in the shop 8 and that controls the display of various views such as a purchasing commodity list view.

The controller 35 includes a CPU (not shown), ROM and RAM, and performs various controls for each component in the mobile terminal 3. The detailed description of the control by controller 35 will be given with reference to FIG. 6.

The reader 36 is, for example, an optical device such as a camera, and reads the bar code 7 attached to each commodity, and supplies the read information to the controller 35. In the present example embodiment, the controller 35 acquires commodity identification information such as a JAN code from the bar code 7 attached to the commodity based on the information outputted by the reader 36.

[Purchasing Commodity List View]

Next, the description will be given of functional blocks, a process flow, and display examples relating to the display of the purchasing commodity list view in order.

(1) Functional Blocks

Figure 6:
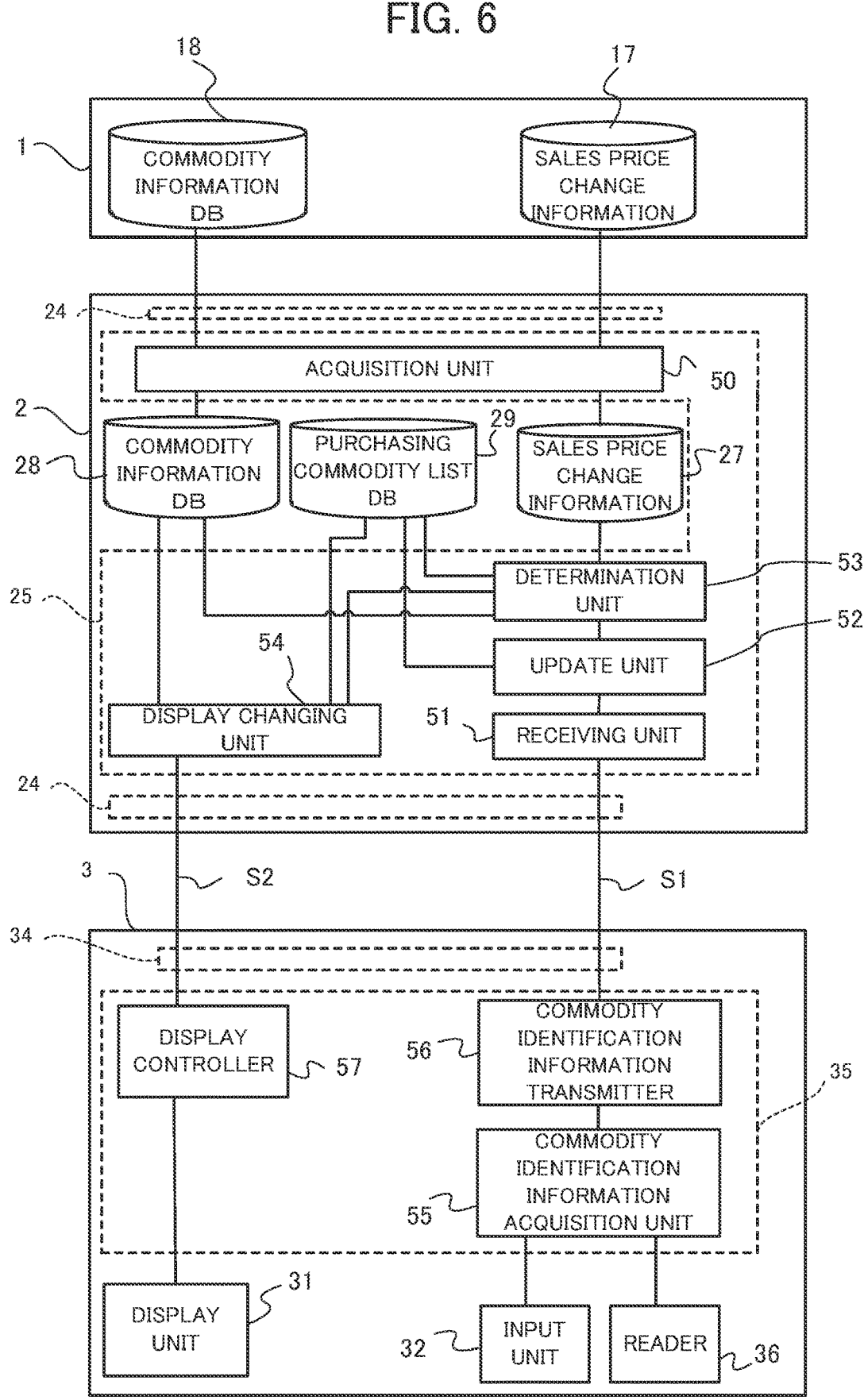
FIG. 6 is a functional block diagram of a sales price management server and the mobile terminal relating to the display of a purchasing commodity list view.

FIG. 6 is a functional block diagram of the sales price management server 2 and the mobile terminal 3 relating to the display of the purchasing commodity list view. As shown in FIG. 6, the controller 35 of the mobile terminal 3 functionally includes a commodity identification information acquisition unit 55, a commodity identification information transmitter 56, and a display controller 57.

The commodity identification information acquisition unit 55 of the mobile terminal 3 acquires the commodity identification information of the commodity with the bar code 7 from an image of the bar code 7 which the reader 36 acquires. In this case, the commodity identification information transmitter 56 transmits the purchasing commodity list change request "S1" to the sales price management server 2 via the communication unit 34. In this case, the purchasing commodity list change request S1 includes: the commodity identification information acquired by the commodity identification information acquisition unit 55; the information instructing the addition of the purchasing commodity; and the customer identification information.

Instead of transmitting the purchasing commodity list change request S1 to the sales price management server 2 immediately after the acquisition of the commodity identification information, the commodity identification information transmitter 56 may transmit the purchasing commodity list change request S1 to the sales price management server 2 in a case of detecting a user input indicating that the commodity of the acquired commodity identification information is a purchasing commodity. In this case, for example, after acquiring the commodities identification information, the display unit 31 displays a view for specifying, through the user input, whether or not to register the commodity indicated by the commodities identification information on the purchasing commodity list.

When there is an input specifying the change of the purchasing quantity (the number) of the purchasing commodity or the deletion of the purchasing commodity through the input unit 32, the commodity identification information transmitter 56 transmits, to the sales price management server 2, the purchasing commodity list change request S1 including: the commodity identification information indicative of the target purchasing commodity; the information indicating the change of the quantity (number) of the target purchasing commodity or a deletion of the target purchasing commodity; and the customer identification information.

when receiving the display information "S2" for displaying the updated purchasing commodity list view from the sales price management server 2 through the communication unit 34, the display controller 57 displays the purchasing commodity list view on the display unit 31 based on the display information S2.

The controller 25 of the sales price management server 2 functionally includes an acquisition unit 50, a second reception unit 51, an update unit 52, a determination unit 53, and a display changing unit 54.

The acquisition unit 50 receives information necessary for keeping the commodity information DB 28 and the sales price change information 27 up-to-date from the POS server 1, and updates the sales price change information 27 and the commodity information DB 28. The receiving unit 51 receives the purchasing commodity list change request S1 transmitted from the mobile terminal 3 through the communication unit 24. Then, the receiving unit 51 supplies the received purchasing commodity list change request S1 to the update unit 52.

The update unit 52 extracts the purchasing commodity list corresponding to the customer identification information included in the purchasing commodity list change request S1 from the purchasing commodity list DB 29 and updates the purchasing commodity list. In this case, when the purchasing commodity list change request S1 indicates an addition to the purchasing commodity list, the update unit 52 adds the purchasing commodity indicated by the commodity identification information included in the purchasing commodity list change request S1 to the extracted purchasing commodity list. Further, when the purchasing commodity list change request S1 indicates a deletion to the purchasing commodity list, the update unit 52 deletes the purchase commodity indicated by the commodity identification information included in the purchasing commodity list change request S1 from the extracted purchasing commodity list. Further, when the purchasing commodity list change request S1 indicates a change in the quantity of the purchasing commodity to be purchased, the update unit 52 changes the quantity of the target purchasing commodity registered in the extracted purchasing commodity list to the quantity indicated by the purchasing commodity list change request S1. Then, the update unit 52 supplies the updated purchasing commodity list to the determination unit 53.

On the basis of the purchasing commodity list supplied from the update unit 52 and the sales price change information 27, the determination unit 53 determines whether or not the sales price of each purchasing commodity in the target purchasing commodity list needs to be changed. In other words, on the basis of the commodity information and the quantity of each purchasing commodity which are indicated by the purchasing commodity list supplied from the update unit 52, the determination unit 53 determines whether any of the sales price change conditions indicated by the sales price change information 27 is satisfied. In the case where any of the sales price change conditions indicated by the sales price change information 27 is satisfied, the determination unit 53 notifies the display changing unit 54 of the discount rate or/and the amount of the discount associated with the satisfied sales price change condition. Further, when the total amount discount information or the like is included in the sales price change information 27, the determination unit 53 compares the total amount indicated by the purchasing commodity list with a sales price change condition indicated by the total amount discount information or the like. When the above sales price change condition is satisfied, the determination unit 53 notifies the display changing unit 54 of the corresponding discount rate or/and the amount of discount.

The display changing unit 54 transmits the display information "S2" regarding the purchasing commodity list view to the mobile terminal 3, thereby changing the purchasing commodity list view displayed by the mobile terminal 3. Specifically, the display changing unit 54 calculates the sales price for each commodity in the purchasing commodity list based on: the purchasing commodity list updated by the update unit 52; the price information on each purchasing commodity acquired from the commodity information DB 28; and the discount rate or/and reduction amount notified from the determining unit 53. Then, the display changing unit 54 generates the display information S2 regarding the purchasing commodity list view to be displayed on the mobile terminal 3 on the basis of the purchasing commodity list and the calculated sales price. At this time, when the display changing unit 54 is notified of the discount rate or/and reduction amount by the determination unit 53, the display changing unit 54 generates the display information S2 including information regarding the sales price in which the discount rate or/and reduction amount is reflected. Then, the display changing unit 54 transmits the generated display information S2 to the mobile terminal 3 via the communication unit 24.

(2) Process Flow

Figure 7:
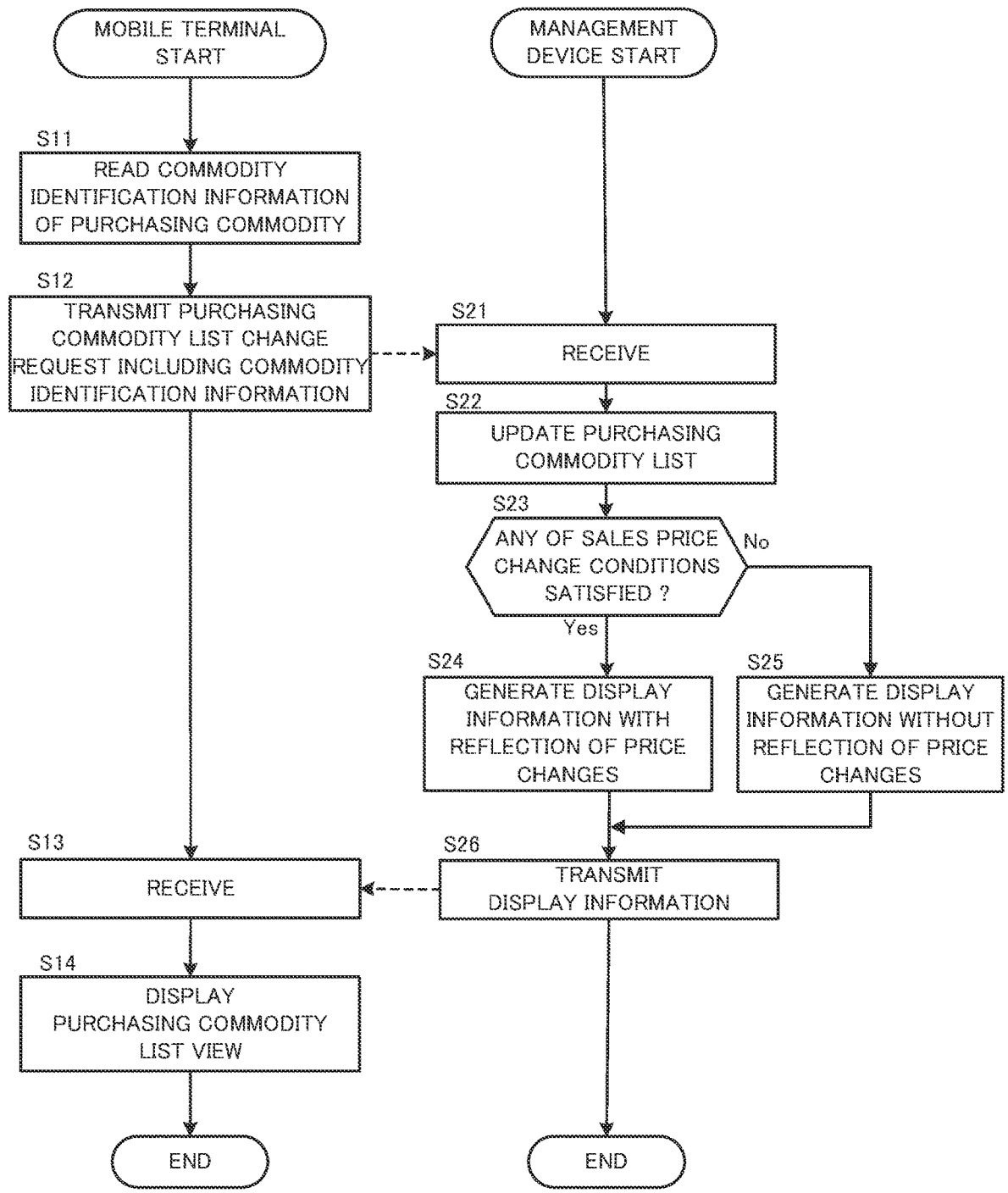
FIG. 7 is an example of a flow chart relating to the display of a purchasing commodity list view.

FIG. 7 is an example of a flowchart relating to the display of the purchasing commodity list view. FIG. 7 illustrates, as an example, a flowchart of a process of displaying the purchasing commodity list view when the commodity identification information is read from a bar code 7 on the commodity.

First, the mobile terminal 3 activates the reader 36 based on the user's operation and reads the commodity identification information from the bar code of the commodity (Step S11). When the store 8 is one store among a plurality of stores the company has, for example, the mobile terminal 3 may acquire the identification information relating to the store 8 by reading the bar code attached to the shopping cart or the like at the time of entering the store 8 based on the user operation. Alternatively, the mobile terminal 3 may automatically select the store 8 from among the plurality of stores and acquire the identification information relating to the store 8 based on the position information relating to the mobile terminal 3. In this case, the mobile terminal 3 transmits the identification information relating to the store 8 together with the customer identification information to the sale sales price management server 2. Then, the sales price management server 2 recognizes that the user having the mobile terminal 3 has entered the store 8, and then performs subsequent processing by referring to the sales price change information 27 and the commodity information DB 28 corresponding to the store 8.

The mobile terminal 3 transmits the purchasing commodity list change request 51 including the commodity identification information read at step S11 to the sales price management server 2 (step S12).

In this case, the sales price management server 2 receives the purchasing commodity list change request 51 transmitted by the mobile terminal 3 (step S21). Then, the sale sales price management server 2 acquires the corresponding purchasing commodity list from the purchasing commodity list DB 29 by referring to the customer identification information or the like included in the purchasing commodity list change request 51, and updates the acquired purchasing commodity list based on the purchasing commodity list change request 51 (step S22). Specifically, the sale sales price management server 2 adds the commodity indicated by the commodities identification information included in the purchasing commodity list change request 51 to the target purchasing commodity list, and stores the updated purchasing commodity list in the purchasing commodity list DB 29. It is noted that, when the corresponding purchasing commodity list does not exist, the sale sales price management server 2 newly generates the purchasing commodity list associated with the customer identification information included in the purchasing commodity list change request S1 and stores it on the purchasing commodity list DB 29.

Then, the sales price management server 2 determines whether the purchasing commodity list updated at step S22 satisfies (corresponds to) any of the sales price change conditions indicated by the sales price change information 27 (step S23). Then, when the updated purchasing commodity list satisfies any of the price changing conditions indicated by the sell price changing information 27 (step S23; Yes), the sales price management server 2 generates the display information S2 regarding the purchasing commodity list view with the reflection of the sales price change in accordance with the discount or reduction associated with the satisfied sell price changing condition (step S24). On the other hand, when the combination of the purchasing commodity indicated by the purchasing commodity list does not satisfy any of the price changing conditions according to the price changing information 27 (step S23; No), the sale sales price management server 2 generates the display information S2 regarding the purchasing commodity list view without reflecting any price change (step S25).

Then, the sales price management server 2 transmits the display information S2 generated at step S24 or step S25 to the mobile terminal 3 which is the transmission source of the purchasing commodity list change request S1 (step S26). In this case, the mobile terminal 3 which has transmitted the purchasing commodity list change request S1 at step S12 receives the display information S2 from the sales price management server 2 (step S13). Then, the mobile terminal 3, based on the display information S2, displays the purchasing commodity list view (step S14).

(3) Display Example

Next, a display example of the purchasing commodity list view will be described with reference to FIGS. 8 to 11.

Figure 8:
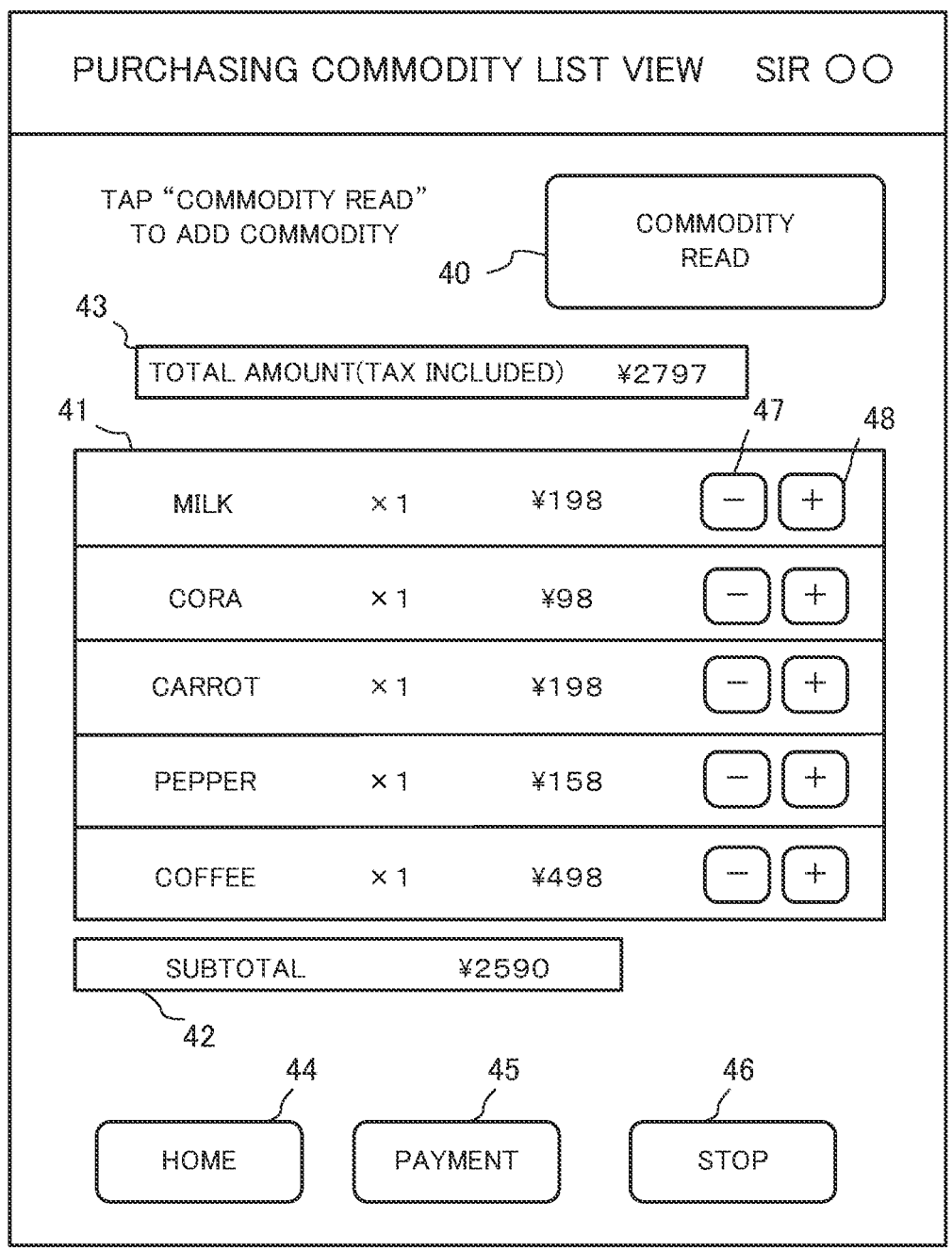
FIG. 8 is an example of displaying the purchasing commodity list view when the purchasing commodity list does not fall under any of the sales price change conditions.

FIG. 8 is a display example of the purchasing commodity list view when the combination of purchasing commodities indicated by the purchasing commodity list does not fall under any of the sales price change conditions. In the example of FIG. 8, the mobile terminal 3 displays, based on the purchasing commodity list change request S1 transmitted from the sales price management server 2, a commodity read button 40, a purchasing commodity list display field 41, a subtotal display field 42, a total amount display field 43, a home view transition button 44, a payment (settlement) view transition button 45 and a trade stop button 46.

The mobile terminal 3 switches the display by the display unit 31 to a commodity reading view when detecting that the commodity reading button 40 has been selected by a tap operation or the like. In the commodity reading view, the mobile terminal 3 displays an image or the like acquired from the activated reader 36. Thus, the user of the mobile terminal 3 moves the commodity or the mobile terminal 3 so that the bar code 7 is positioned within the reading range of the reader 36.

Further, on the purchasing commodity list display field 41, the mobile terminal 3 displays the name, the quantity, the price of the purchasing commodity for each purchasing commodity. Further, on the purchasing commodity list display field 41, the mobile terminal 3 displays a number decrement button 47 and a number increment button 48 for each purchasing commodity. Then, for example, when the mobile terminal 3 accepts a change in the quantity of the purchasing commodity through the number decrement button 47 or number increment button 48, the mobile terminal 3 transmits to the sales price management server 2 the commodity list change request S1 including the information on the quantity the commodity identification information on the target purchasing commodity of the change and the quantity thereof after the change.

Further, on the subtotal display field 42, the mobile terminal 3 displays the subtotal (tax exclusion) of the sales price for all commodities in the purchasing commodity list, and on the total amount display field 43, the mobile terminal 3 displays the total amount (tax inclusion) of the sales price for all commodities in the purchasing commodity list. The price control server 2 calculates these subtotals or totals based on the sales price of the purchasing commodity registered in the commodity information DB 28.

When the mobile terminal 3 detects that the home view transition button 44 is selected, it transmits a display request of the home view to the sales price management server 2 and displays a predetermined home view based on the display information received as the response. The home view may display information on the discounts and the reductions at the store 8 and/or the registration information on the customer of the mobile terminal 3.

Further, when detecting that the payment view transition button 45 is selected, the mobile terminal 3 transmits the display request of the payment view to the sales price management server 2, and displays a predetermined payment view based on the display information received as the response. The payment view includes, for example, a display for confirming the total quantity of the purchasing commodity and the total amount of the sales price for the purchasing commodity, and a display such as a button and an input field for specifying the payment (adjustment) option. When the payment such as credit cards and electronic money is selected, the mobile terminal 3 exchanges, with the sale sales price management server 2 and the like, data necessary for the adjustment processing based on the electronic commerce to complete the payment (adjustment).

Further, when the payment by cash is selected, the mobile terminal 3 performs adjustment by displaying a readable bar code that the adjustment machine 5 can read thereby to let the adjustment machine 5 read the bar code. In this case, the adjustment machine 5 recognizes the purchasing commodity and the quantity thereof to be purchased by reading the bar code described above and calculates the total amount to be paid by the user of the mobile terminal 3. In this case, the total amount the adjustment machine 5 calculates is equal to the total amount displayed on the total amount display field 43.

Further, when detecting that the trade stop button 46 is selected, the mobile terminal 3 transmits information notifying the sales price management server 2 of the trade stop. In this case, the sale sales price management server 2 deletes the purchasing commodity list corresponding to the customer identification information relating to the mobile terminal 3.

Figure 9:
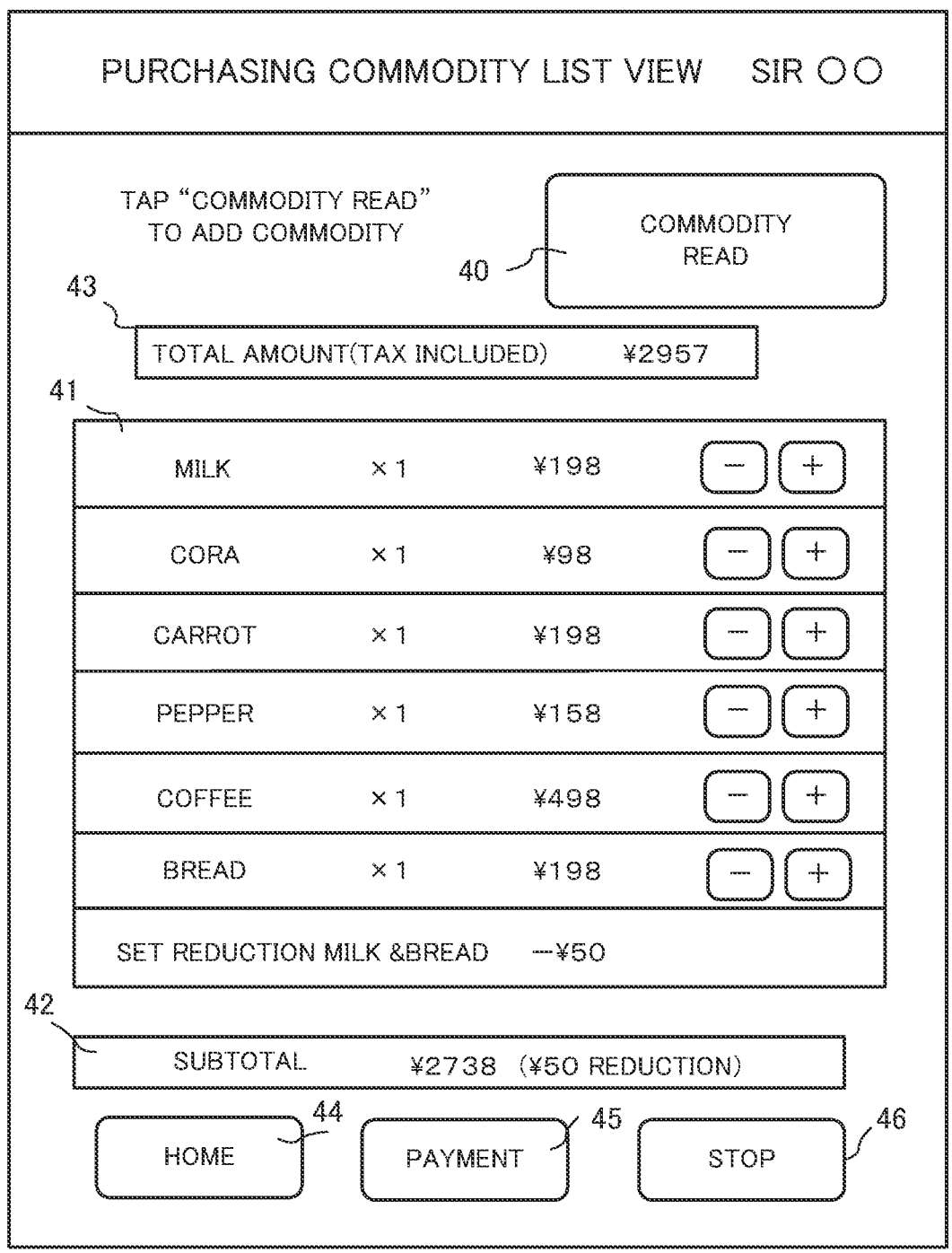
FIG. 9 is a display example of the purchasing commodity list view when a commodity "BREAD" is added as a purchasing commodity from the state indicated by FIG. 8.

FIG. 9 is a display example of a purchasing commodity list view when the commodity "BREAD" is added as a purchasing commodity from the state shown in FIG. 8. In this example, the commodity reading button 40 is selected in FIG. 8 and then the mobile terminal 3 registers the commodity "BREAD" by reading the bar code 7 attached to the commodity "BREAD".

In this case, as a sales price change condition according to the sales price change information 27, there is a simultaneous purchase of milk and bread and a reduction by ¥50 is associated with this sales price change condition. Then, in this case, the sale sales price management server 2 adds the item of "BREAD" to the purchasing commodity list display field 41 as a purchase commodity, and further provides the item of reduction by ¥50 based on the simultaneous purchase of milk and bread. Further, the sales price management server 2 calculates the subtotal and the total amount reflecting the above-mentioned reduction by ¥50, respectively, thereby to display them on the subtotal display field 42 and the total amount display field 43, respectively.

Thus, when a discount or reduction based on the sales price change information 27 occurs due to the addition of the purchase commodity, the sale sales price management server 2 immediately let the mobile terminal 3 display the total amount reflecting the discount or the reduction on the purchasing commodity list view to be displayed thereafter. Thus, the sales price management server 2 can make the user of the mobile terminal 3 recognize the accurate price at the present time. Further, the sales price management server 2 clearly indicates the amount of change in the sales price (reduction by ¥50 in the example of FIG. 9) on the purchasing commodity list view, thereby allowing the customer of the mobile terminal 3 to appropriately recognize the presence of a discount or a reduction.

In the case of specifications that the bar code reading view transitions, after reading the bar code 7, to a view other than a purchasing commodity list view such as a home view without transitioning to a purchasing commodity list view, the sales price management server 2 may calculate the above-described discount or reduction at the time when the display request of the purchasing commodity list view is received from the mobile terminal 3. Namely, the sales price management server 2 may execute the process at step S23 and the subsequent processes in FIG. 7 at the time of receiving the display request regarding the purchasing commodity list view from the mobile terminal 3.

Figure 10:
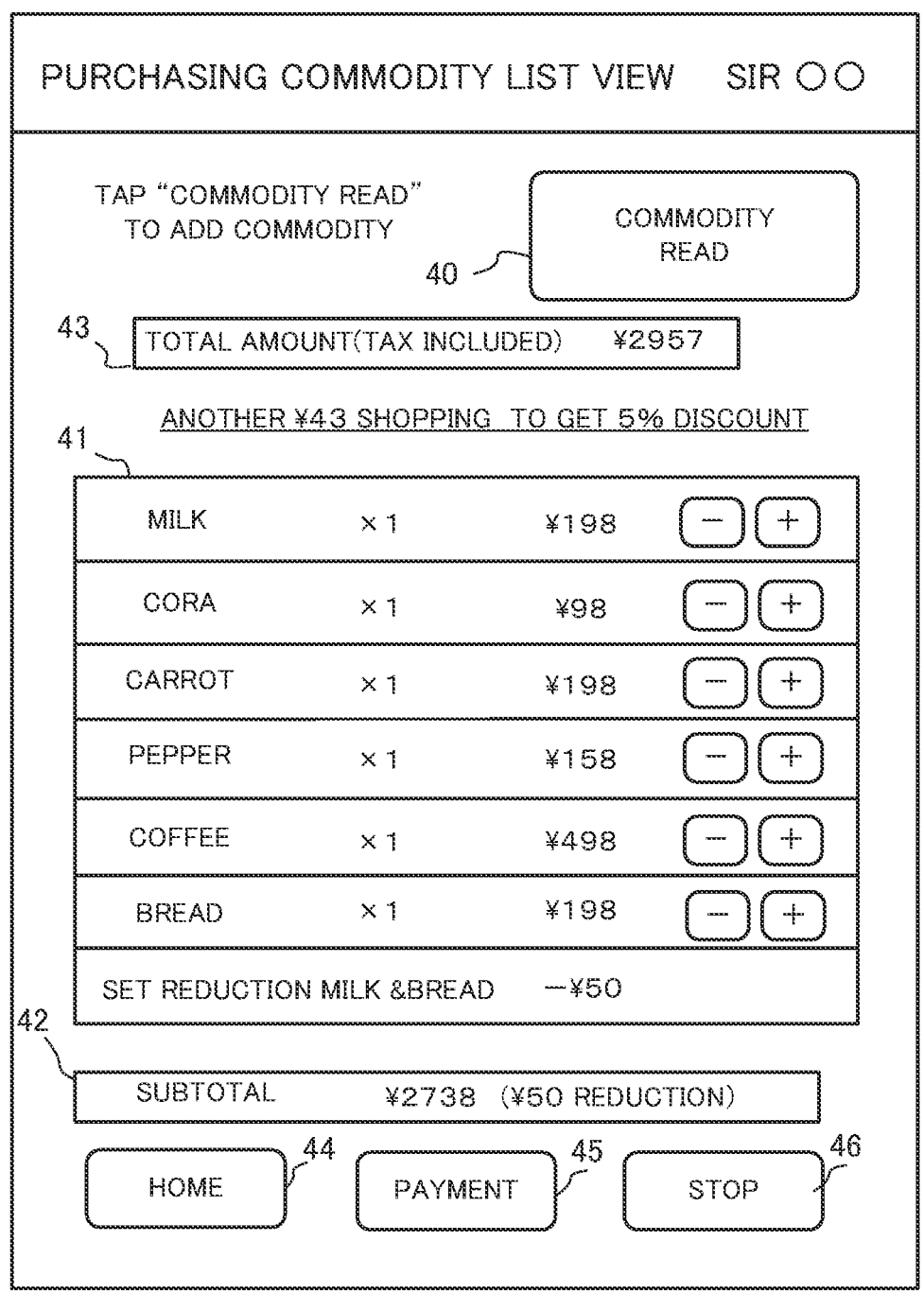
FIG. 10 is a second display example of the purchasing commodity list view when a commodity "BREAD" is added as a purchasing commodity from the state indicated by FIG. 8.

FIG. 10 is a second display example of the purchasing commodity list view when the commodity "BREAD" is added as a purchasing commodity from the state shown in FIG. 8. In this example, it is assumed that the sales price change information 27 further includes the total discount information indicative of 5% discount when the total amount is ¥3000 or more in addition to the set reduction information indicative of ¥50 reduction for simultaneous purchase of milk and bread.

In this case, similarly to the display example of FIG. 9, the sale sales price management server 2 reflects the reduction by ¥50 based on the simultaneous purchase of milk and bread to the contents on the purchasing commodity list display field 41, the subtotal display field 42 and the total amount display field 43, respectively. In addition, since it approaches, within a predetermined amount, the total amount of ¥3000 (3000 yen) or more indicated by the sales price change condition of the total amount discount information, the sales price management server 2 explicitly displays the existence of the total amount discount information indicative of 5% discount for the total amount of ¥3000 or more on the purchasing commodity list view. Here, the sales price management server 2 specifies the difference (¥43) between the reference total amount (here ¥3000) of the total amount necessary to satisfy the sales price change condition indicated by the total amount discount information and the total sales price (here ¥2957) for the commodities in the purchasing commodity list at the present time. As described above, when the sales price change condition is about to be satisfied, the sales price management server 2 may display, on the purchasing commodity list view, the sales price change condition and the requirement necessary to satisfy the sales price change condition. It is noted that the case where the sales price change condition is about to be satisfied is, for example, such a case the current total amount approaches the reference total amount within a predetermined amount, or a case the sales price change condition is satisfied by adding one more specific commodity as a purchasing commodity.

Thus, according to the example of FIG. 10, the user of the mobile terminal 3 can recognize the accurate sales price on the purchasing commodity list view before the adjustment. Furthermore, when there is a discount or a reduction corresponding to the total amount, the user can suitably recognize the amount of difference necessary to receive the discount or the reduction.

[Modification]

Next, a description will be given of preferred modifications of the present example embodiment. The following modifications may be optionally combined and applied to the example embodiments described above.

(First Modification)

The sales price management server 2 immediately reflected a discount or a reduction according to the sales price change information 27 to the purchasing commodity list view when an addition of a purchasing commodity in which the discount or the reduction based on the sales price change information 27 occurs. Alternatively, the sales price management server 2 may reflect the discount or the reduction according to the sales price change information 27 to the purchasing commodity list view when it detects a predetermined input to the mobile terminal 3 that instructs the reflection of the discount or the reduction according to the sales price change information 27 to the purchasing commodity list view.

Figure 11:
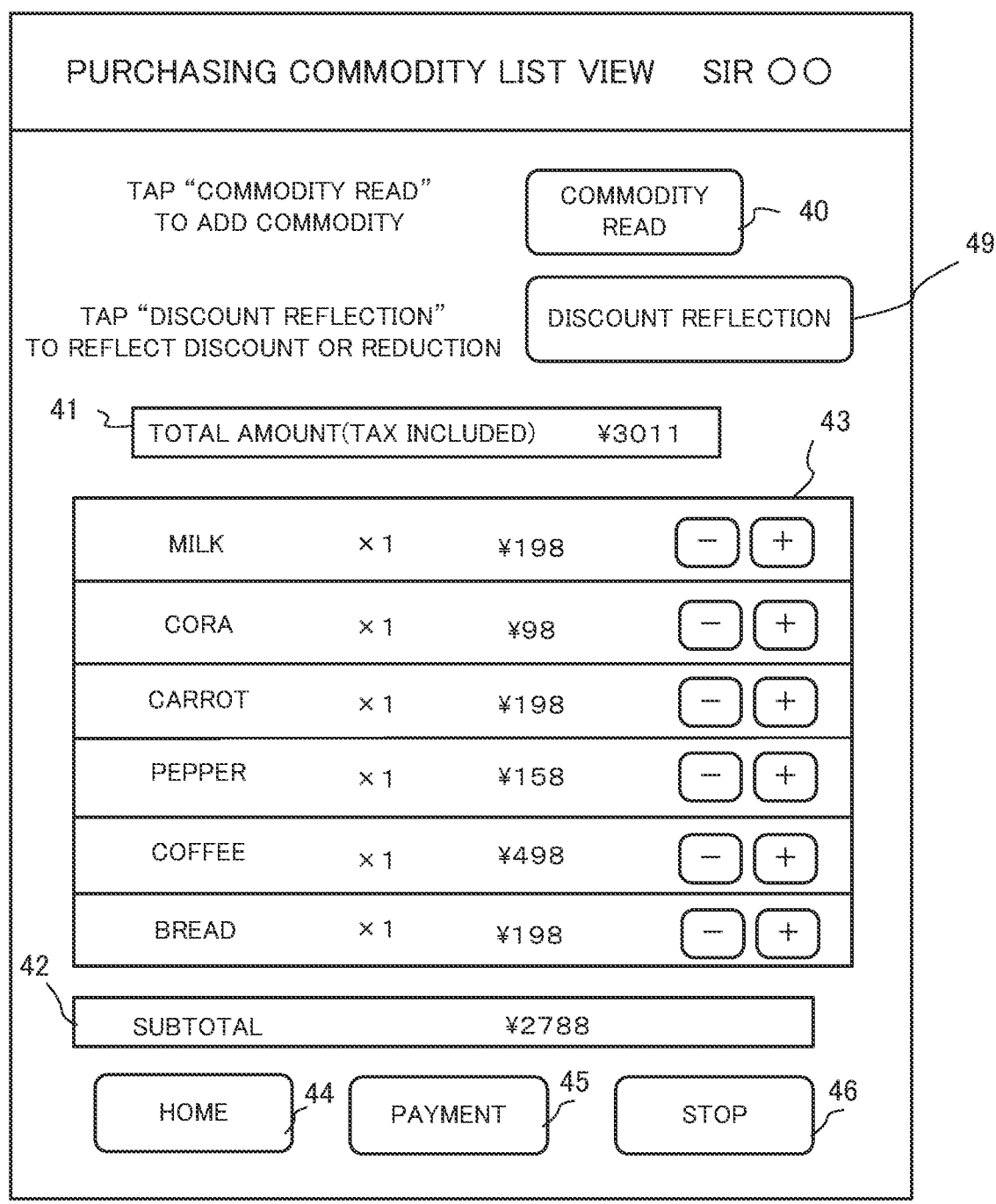
FIG. 11 is a display example of the purchasing commodity list view according to a first modification.

FIG. 11 is a display example of the purchasing commodity list view according to the first modification. The purchasing commodity list view shown in FIG. 11 has a discount reflection button 49 which is a user interface for reflecting a discount or a reduction according to the sales price change information 27 on the purchasing commodity list view.

Thus, in the example of FIG. 11, before the selection of the discount reflection button 49, the sales price management server 2 transmits the display information S2 generated without considering the discount or the reduction according to the sales price change information 27 to the mobile terminal 3. In this way, the sales price management server 2 displays the purchasing commodity list view in which the discount or the reduction according to the sales price change information 27 is not reflected on the mobile terminal 3. In this case, the determination unit 53 (see FIG. 6) of the sale sales price management server 2 does not execute the determination process of the discount or the reduction, and the display changing unit 54 generates the display information S2 based on the purchasing commodity list updated by the update unit 52 and the sales price information included in the commodity information DB 28.

Figure 12:
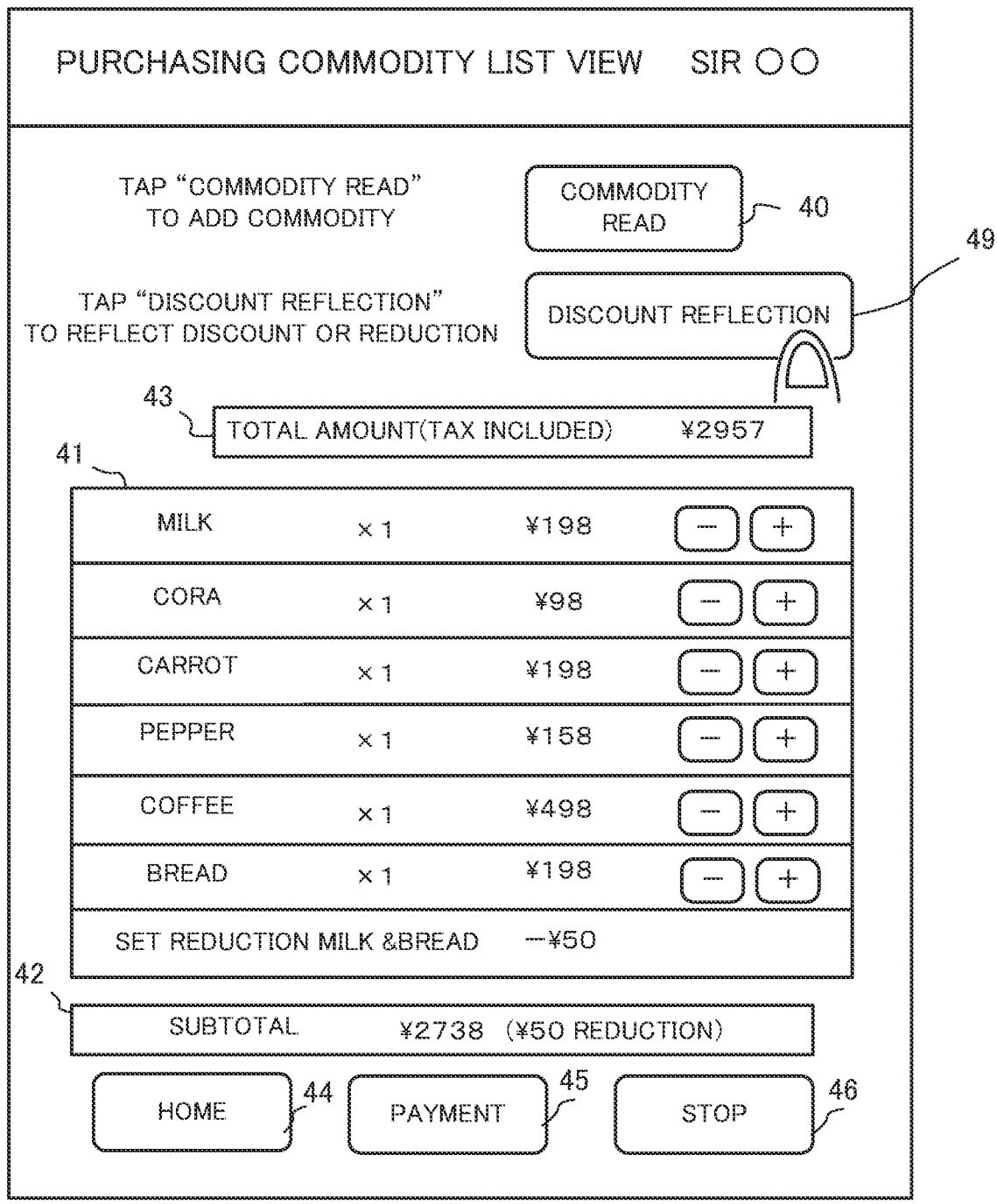
FIG. 12 is a display example of the purchasing commodity list view immediately after the user taps the discount reflection button in the state indicated by FIG. 11.

FIG. 12 illustrates a display example of a purchasing commodity list view immediately after the user taps the discount reflection button 49 in FIG. 11. As shown in FIG. 12, in this case, on the basis of the display information S2 received from the sales price management server 2, the mobile terminal 3 updates the purchasing commodity list view so that the purchasing commodity list display field 41, the subtotal display field 42 and the total amount display field 43 are identical to the purchasing commodity list display field 41, the subtotal display field 42 and the total amount display field 43 shown in FIG. 9, respectively.

Specifically, when detecting the selection of the discount reflection button 49, the mobile terminal 3 transmits, to the sales price management server 2, a request for reflection to the purchasing commodity list view of the discount or the reflection according to the sales price change information 27. Then, when the communication unit 24 receives the above-described reflection request, the sale sales price management server 2 (more specifically, the determination unit 53 in FIG. 6) determines whether or not there is a discount or a reduction according to the sales price change information 27 based on: the purchasing commodity list corresponding to the mobile terminal 3 that is the transmission source; and the commodity information on the commodities included in the purchasing commodity list. Then, in this case, since there is a simultaneous purchase of milk and bread as a price changing condition according to the price changing information 27, the determination unit 53 recognizes the reduction by ¥50 corresponding to the above price changing condition, and notifies the display changing unit 54 of the reduction by ¥50. Then, the display changing unit 54 transmits to the mobile terminal 3 the display information S2 for reflecting the reduction by ¥50. In this case, the display controller 57 of the mobile terminal 3 updates the purchasing commodity list view based on the display information S2.

According to this modification, the mobile terminal 3 can reflect, at any timing specified by the user, the discount or the reduction according to the sales price change information 27 on the purchasing commodity list view before the adjustment. This allows the user to appropriately recognize the presence of the discount or reduction before the adjustment.

(Second Modification)

The sales price change information 17 and the sales price change information 27 may further include member discount information or member reduction information indicating a discount or a reduction to be granted when the customer is a member, and/or member rank discount information or member rank reduction information indicating a discount or a reduction to be granted according to the rank of the member.

Figure 13:
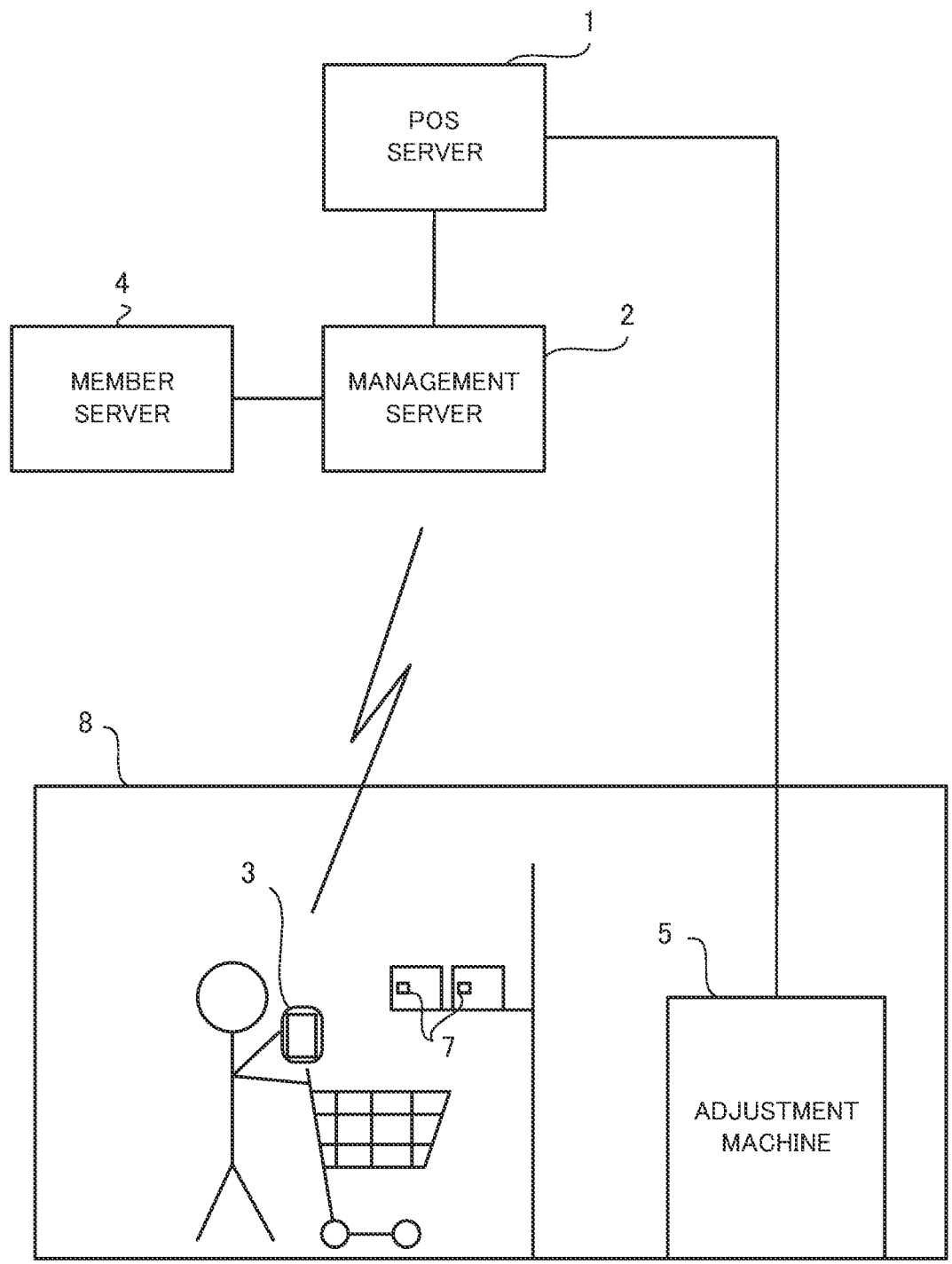
FIG. 13 is a configuration example of a sales price management system according to a second modification.

FIG. 13 is a configuration example of a sales price control system 100A according to the second modification. The sales price control system 100A has a member server 4 for storing member information. The member server 4 can communicate with the sales price management server 2 through a network or the like. When the customer having the mobile terminal 3 enters the store 8, the sales price management server 2 makes an inquiry to the member server 4 based on the customer identification information or the like transmitted from the mobile terminal 3, thereby recognizing whether or not the customer of the target mobile terminal 3 is a member and/or the member rank (grade) of the customer of the target mobile terminal 3. Then, the determination unit 53 of the sale sales price management server 2 determines whether or not there is a discount or a reduction by referring to the member rank discount information or the member rank reduction information based on the presence/absence of the member registration or the recognized member rank. According to this example, the sales price management server 2 can suitably reflect, to the purchasing commodity list view, the discount or the reduction according to the sales price change information 27 relating to the member.

In another example, the sales price change information 17 and sales price change information 27 may have monthly total amount discount information or monthly total amount reduction information. In this case, the monthly total amount discount information is information on the discount that occurs when the amount of purchase at the store 8 (or series stores including the store 8) per month is equal to or greater than a predetermined amount. In the monthly total amount discount information, for example, the total amount to be discounted are associated with the discount rate. The monthly total reduction information is reduction information corresponding to the monthly total discount information. In this case, the POS server 1 stores purchase history information for shopping at the store 8 (or series stores including the store 8) with respect to each customer, and the sale sales price management server 2 stores the purchase history information for each customer by synchronizing the purchase history information by communicating with the POS server 1 periodically or irregularly. Then, by referring to the purchase history information, the commodity information DB 28, and the purchasing commodity list DB 29, the determination unit 53 of the sale sales price management server 2 sums the purchase amount at the past shopping and the total amount at the present shopping, and determines whether or not the sales price change condition indicated by the monthly total amount discount information or the monthly total amount reduction information is satisfied. According to this example, the sale sales price management server 2 can suitably reflect, to the purchasing commodity list view, the discount or reduction according to the monthly total amount discount information or monthly total amount reduction information.

(Third Modification)

The POS server 1 and the sales price management server 2 may be configured as a single server device. In this case, for example, the sales price management server 2 stores the data stored on the POS server 1 in a manner that the data cannot be directly accessed from the mobile terminal 3. For example, in this case, the sales price management server 2 stores, on the first memory that the data cannot be directly accessed from the mobile terminal 3, the sales price change information 17, the commodity information DB 18 and the sales information 19 which are described in the example embodiment. In contrast, the sales price management server 2 stores, on a second memory accessible from the mobile terminal 3, the sales price change information 27, the commodity information DB 28 and the purchasing commodity list 29 which are described in the example embodiment. The sales price management server 2 refers to the first memory and periodically or irregularly updates the sales price change information 27 and the commodity information DB 28 stored on the second memory.

The whole or a part of the example embodiments described above (including modifications, the same applies hereinafter) can be described as, but not limited to, the following Supplementary Notes.

[Supplementary Note 1]

A sales price management server comprising:

an acquisition unit configured to acquire sales price change information relating to a sales price change;

a receiving unit configured to receive, from a mobile terminal used by a customer, commodity identification information indicative of a commodity the customer intends to purchase at a store where the customer enters;

a determination unit configured to determine, on a basis of the sales price change information and a purchasing commodity list that is a list of the commodity, whether or not a change of the sales price for the commodity in the purchasing commodity list is required; and a display changing unit configured, in a case where the change of the sales price is required, to change a display of the sales price for the commodity in the purchasing commodity list that the mobile terminal displays.

[Supplementary Note 2]

The sales price management server according to Supplementary Note 1, further comprising an update unit configured to generate or update, on a basis of the commodity identification information, the purchasing commodity list that is the list of the commodity.

[Supplementary Note 3]

The sales price management server according to Supplementary Note 2, wherein, when the purchasing commodity list is updated and the change of the sales price is required, the display changing unit reflects the change of the sales price to the display of the sales price at least before the customer performs an adjustment at the store.

[Supplementary Note 4]

The sales price management server according to Supplementary Note 3, wherein, when the purchasing commodity list is updated and the change of the sales price is required, the display changing unit immediately reflects the change of the sales price to the display of the sales price.

[Supplementary Note 5]

The sales price management server according to Supplementary Note 3, wherein, when the purchasing commodity list is updated and the change of the sales price is required, the display changing unit reflects the change of the sales price to the display of the sales price in a case of detecting a predetermined input to the mobile terminal.

[Supplementary Note 6]

The sales price management server according to Supplementary Note 3, wherein the sales price change information indicates at least one of:

a discount or a reduction based on a quantity of the commodity;

a discount or a reduction based on a combination of the commodity;

a discount or a reduction based on a total amount of the sales price;

a discount or a reduction for a specific type of the commodity; or a discount or a reduction based on whether or not the customer is a member or a rank of the member.

[Supplementary Note 7]

The sales price management server according to any one of Supplementary Notes 1 to 6, wherein, when the purchasing commodity list is updated and the change of the sales price is required, the display changing unit displays, on the mobile terminal, an amount of the change of the sales price.

[Supplementary Note 8]

The sales price management server according to any one of Supplementary Notes 1 to 7, wherein the sales price change information includes information on a discount or a reduction based on a total amount of the sales price, and wherein the display changing unit displays, on the mobile terminal, a difference between a necessary total amount to apply the discount or the reduction and the sales price for the commodity in the purchasing commodity list.

[Supplementary Note 9]

A sales price management system comprising:

a mobile terminal used by a customer; and a sales price management server which manages a sales price for a purchasing commodity list that is a list of a commodity the customer intends to purchase at a store where the customer enters, the mobile terminal comprising:

a commodity identification acquisition unit configured to acquire commodity identification information indicative of a commodity the customer intends to purchase at the store;

a commodity identification transmission unit configured to transmit the commodity identification information to the sales price management server; and a display controller configured to update a display on a display unit based on display information received from the sales price management server, the sales price management server comprising:

an acquisition unit configured to acquire sales price change information relating to a sales price change;

a receiving unit configured to receive, from the mobile terminal, the commodity identification information;

a determination unit configured to determine, on a basis of the sales price change information and the purchasing commodity list, whether or not a change of the sales price for the commodity in the purchasing commodity list is required; and a display changing unit configured, in a case where the change of the sales price is required, to transmit, to the mobile terminal, the display information to change the display of the sales price for the commodity in the purchasing commodity list that the mobile terminal displays.

[Supplementary Note 10]

A control method which a sales price management server executes, the control method comprising:

acquiring sales price change information relating to a sales price change;

receiving, from a mobile terminal used by a customer, commodity identification information indicative of a commodity the customer intends to purchase at a store where the customer enters;

determining, on a basis of the sales price change information and a purchasing commodity list that is a list of the commodity, whether or not a change of the sales price for the commodity in the purchasing commodity list is required; and changing, in a case where the change of the sales price is required, a display of the sales price for the commodity in the purchasing commodity list that the mobile terminal displays.

[Supplementary Note 11]

A program executed by a computer, the program causing the computer to function as:

an acquisition unit configured to acquire sales price change information relating to a sales price change;

a receiving unit configured to receive, from a mobile terminal used by a customer, commodity identification information indicative of a commodity the customer intends to purchase at a store where the customer enters;

a determination unit configured to determine, on a basis of the sales price change information and a purchasing commodity list that is a list of the commodity, whether or not a change of the sales price for the commodity in the purchasing commodity list is required; and a display changing unit configured, in a case where the change of the sales price is required, to change a display of the sales price for the commodity in the purchasing commodity list that the mobile terminal displays.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims. In other words, it is needless to say that the present invention includes various modifications that could be made by a person skilled in the art according to the entire disclosure including the scope of the claims, and the technical philosophy. All Patent Literatures mentioned in this specification are incorporated by reference in its entirety.

DESCRIPTION OF REFERENCE NUMERALS

1 POS server
2 Sales price management server
3 Mobile terminal
4 Member server
5 Adjustment machine
100, 100A Sales price management system

What is claimed is:

1. A sales price management server comprising at least one processor configured to:

communicate with a mobile terminal and a point-of-sale (POS) server over a network;

receive store identification information relating to a store entered by a customer from the mobile terminal which is used by the customer to purchase a purchasing commodity list of a plurality of commodities in the store;

acquire over the network, from the POS server indicating sales price change information corresponding to the store indicated by the store identification information, the sales price change information relating to a sales price change;

receive over the network, from the mobile terminal and after receiving the store identification information, a commodity list change request generated by the mobile terminal and that includes commodity identification information regarding each of the commodities, the commodity list change request generated by the mobile terminal after the mobile terminal acquires the commodity identification information from images of bar codes of the commodities and displays the commodity identification information after the mobile terminal sends the store identification information to the sales price management server, the customer intending to purchase the commodities at the store;

determine, on a basis of the sales price change information and the purchasing commodity list, whether or not a change of the sales price for each of the commodities in the purchasing commodity list is required;

generate information for displaying the purchasing commodity list on the mobile terminal;

for each of the commodities for which the change of the sales price is required, change the sales price for the commodity in the purchasing commodity list to be displayed on the mobile terminal, and transmit the changed sales price to the mobile terminal for display; and cause the mobile terminal to display a user interface including a view of the purchasing commodity list, wherein the view includes:

a plurality of lines respectively corresponding to the commodities in the purchasing commodity list, each line listing a name of the commodity to which the line corresponds, a purchase quantity of the commodity, and the sales price of the commodity;
a purchase amount based at least on the sales price and the purchase quantity of each commodity; and
a button that is user selectable to toggle the user interface between a first mode and a second mode, wherein
in the first mode, the sales price listed in the line for each of the commodities for which the change of the sales price does not reflect the change of the sales price, and the purchase amount does not indicate the change of the sales price, and
in the second mode, the sales price listed in the line for each of the commodities for which the change of the sales price does reflect the change of the sales price, and the purchase amount indicates the change of the sales price.

2. The sales price management server according to claim 1, wherein the processor is further configured to generate or update, on a basis of the commodity identification information, the purchasing commodity list.

3. The sales price management server according to claim 2, wherein, when the purchasing commodity list is updated and the change of the sales price is required, the processor reflects the change of the sales price to the sales price as displayed by the mobile terminal at least before the customer performs an adjustment at the store.

4. The sales price management server according to claim 3, wherein, when the purchasing commodity list is updated and the change of the sales price is required, the processor immediately reflects the change of the sales price to the sales price as displayed by the mobile terminal.

5. The sales price management server according to claim 3, wherein, when the purchasing commodity list is updated and the change of the sales price is required, the processor reflects the change of the sales price to the sales price as displayed by the mobile terminal in response to the mobile terminal detecting a predetermined input.

6. The sales price management server according to claim 1, wherein, for each of the commodities for which the change of the sales price is required, the sales price change information indicates at least one of:
a discount or a reduction based on a quantity of the commodity;
a discount or a reduction based on a combination of the commodity;
a discount or a reduction based on a total amount of the sales price;
a discount or a reduction for a specific type of the commodity; or
a discount or a reduction based on whether or not the customer is a member or a rank of the member.

7. The sales price management server according to claim 1, wherein, when the purchasing commodity list is updated and the change of the sales price is required, the processor transmits an amount of the change of the sales price to the mobile terminal for display.

8. The sales price management server according to claim 1,
wherein the sales price change information includes information on a discount or a reduction based on a total amount of the sales price, and wherein the processor transmits, to the mobile terminal for display, a difference between a necessary total amount to apply the discount or the reduction and the sales price.

9. A sales price management system comprising:
a mobile terminal which is used by a customer and which reads commodity identification information; and
a sales price management server which manages a sales price for a purchasing commodity list of a plurality of commodities the customer intends to purchase at a store which is subject to payment in the store,
the mobile terminal comprising a processor configured to:
acquire the commodity identification information of each of the commodities;
transmit the commodity identification information to the sales price management server; and
update a display based on display information received from the sales price management server,
the sales price management server comprising at least one processor configured to:
communicate with the mobile terminal and a point-of-sale (POS) server over a network;
receive store identification information relating to the store entered by the customer from the mobile terminal which is used by the customer;
acquire over the network, from the POS server indicating sales price change information corresponding to the store indicated by the store identification information, the sales price change information relating to a sales price change;
receive over the network, from the mobile terminal and after receiving the store identification information, a commodity list change request generated by the mobile terminal and that includes commodity identification information regarding each of the commodities, the commodity list change request generated by the mobile terminal after the mobile terminal acquires the commodity identification information from images of bar codes of the commodities and displays the commodity identification information after the mobile terminal sends the store identification information to the sales price management server;
determine, on a basis of the sales price change information and the purchasing commodity list, whether or not a change of the sales price for each of the commodities in the purchasing commodity list is required;
generate information for displaying the purchasing commodity list on the mobile terminal;
for each of the commodities for which the change of the sales price is required, change the sales price for the commodity in the purchasing commodity list to be displayed on the mobile terminal, and transmit the changed sales price to the mobile terminal for display; and,
cause the mobile terminal to display a user interface including a view of the purchasing commodity list, wherein the view includes:
a plurality of lines respectively corresponding to the commodities in the purchasing commodity list, each line listing a name of the commodity to which the line corresponds, a purchase quantity of the commodity, and the sales price of the commodity;
a purchase amount based at least on the sales price and the purchase quantity of each commodity; and
a button that is user selectable to toggle the user interface between a first mode and a second mode, wherein in the first mode, the sales price listed in the line for each of the commodities for which the change of the sales price does not reflect the change of the sales price, and the purchase amount does not indicate the change of the sales price, and in the second mode, the sales price listed in the line for each of the commodities for which the change of the sales price does reflect the change of the sales price, and the purchase amount indicates the change of the sales price.

10. A control method which a sales price management server executes, the control method comprising:

communicating with a mobile terminal and a point-of-sale (POS) server over a network;

receiving store identification information relating to a store entered by a customer from the mobile terminal which is used by the customer to purchase a purchasing commodity list of a plurality of commodities in the store;

acquiring over the network, from the POS server indicating sales price change information corresponding to the store indicated by the store identification information, the sales price change information relating to a sales price change;

receiving over the network, from the mobile terminal and after receiving the store identification information, a commodity list change request generated by the mobile terminal and that includes commodity identification information regarding each of the commodities, the commodity list change request generated by the mobile terminal after the mobile terminal acquires the commodity identification information from images of bar codes of the commodities and displays the commodity identification information after the mobile terminal sends the store identification information to the sales price management server, the customer intending to purchase the commodities at the store;

determining, on a basis of the sales price change information and the purchasing commodity list, whether or not a change of the sales price for each of the commodities in the purchasing commodity list is required;

generating information for displaying the purchasing commodity list on the mobile terminal;

for each of the commodities for which the change of the sales price is required, changing the sales price for the commodity in the purchasing commodity list to be displayed on the mobile terminal, and transmit the changed sales price to the mobile terminal for display; and causing the mobile terminal to display a user interface including a view of the purchasing commodity list, wherein the view includes:

a plurality of lines respectively corresponding to the commodities in the purchasing commodity list, each line listing a name of the commodity to which the line corresponds, a purchase quantity of the commodity, and the sales price of the commodity;

a purchase amount based at least on the sales price and the purchase quantity of each commodity; and a button that is user selectable to toggle the user interface between a first mode and a second mode, wherein in the first mode, the sales price listed in the line for each of the commodities for which the change of the sales price does not reflect the change of the sales price, and the purchase amount does not indicate the change of the sales price, and in the second mode, the sales price listed in the line for each of the commodities for which the change of the sales price does reflect the change of the sales price, and the purchase amount indicates the change of the sales price.

* * * * *